(12) United States Patent
Kim et al.

(10) Patent No.: US 12,611,890 B2
(45) Date of Patent: Apr. 28, 2026

(54) WHEEL COVER WITH MOVEABLE VENT STRUCTURE

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Ju Ho Kim, Suwon-Si (KR); Jeong Hwan Park, Seoul (KR); Do Hyun Kong, Gwangmyeong-Si (KR); Xu Han, Seoul (KR); Xinpei Ai, Seoul (KR); Yea Jun Yoo, Seoul (KR); Wei Wang, Seoul (KR); Beom Chan Kang, Seoul (KR)

(73) Assignees: Hyundai Motor Company, Seoul (KR); Kia Corporation, Seoul (KR); IUCF-HYU (Industry-University Coop Foundation Hanyang Univ), Seoul (KR)

(*) Notice: Subject to any disclaimer, the term of this patent is extended or adjusted under 35 U.S.C. 154(b) by 402 days.

(21) Appl. No.: 18/224,732

(22) Filed: Jul. 21, 2023

(65) Prior Publication Data

US 2024/0286432 A1 Aug. 29, 2024

(30) Foreign Application Priority Data

Feb. 23, 2023 (KR) ........................ 10-2023-0024577

(51) Int. Cl.
*B60B 7/04* (2006.01)
*B60B 7/06* (2006.01)

(52) U.S. Cl.
CPC ................ *B60B 7/04* (2013.01); *B60B 7/061* (2013.01); *B60B 2360/10* (2013.01); *B60B 2900/513* (2013.01)

(58) Field of Classification Search
CPC ........... B60B 7/061; B60B 7/04; B60B 19/10
USPC ......................................................... 301/6.3
See application file for complete search history.

(56) References Cited

U.S. PATENT DOCUMENTS

| | | | | |
|---|---|---|---|---|
| 4,593,953 | A * | 6/1986 | Baba ..................... | B60B 7/0086 |
| | | | | 301/6.3 |
| 9,233,575 | B2 * | 1/2016 | Haase ....................... | B60B 1/06 |
| 9,919,555 | B2 * | 3/2018 | Wippler ................ | B60B 7/0086 |
| 10,744,816 | B2 * | 8/2020 | Bach ......................... | B60B 7/18 |

(Continued)

FOREIGN PATENT DOCUMENTS

| | | | |
|---|---|---|---|
| DE | 10-2011-117088 | A1 | 5/2013 |
| KR | 10-2016-0063486 | A | 6/2016 |

(Continued)

*Primary Examiner* — Jason R Bellinger
(74) *Attorney, Agent, or Firm* — MORGAN, LEWIS & BOCKIUS LLP

(57) ABSTRACT

A wheel cover includes a fixing unit fixed to a wheel of a vehicle, a variable unit coupled to and supported by the fixing unit and configured for being opened and closed, a first power unit configured to apply a first force acting on the variable unit, wherein the force changes depending on temperature, and a second power unit configured to apply a second force acting on the variable unit, wherein the second force changes depending on a wheel speed, wherein the variable unit is opened or closed depending on the first force generated by the first power unit and the second force generated by the second power unit.

19 Claims, 15 Drawing Sheets

(56)                     References Cited

U.S. PATENT DOCUMENTS

| | | | |
|---|---|---|---|
| 11,077,707 B2 * | 8/2021 | Wong | B60B 7/066 |
| 2009/0195053 A1 * | 8/2009 | Kruse | B60B 7/0053 |
| | | | 301/6.4 |
| 2013/0313889 A1 * | 11/2013 | Schmid | B60B 7/00 |
| | | | 301/37.107 |
| 2014/0175858 A1 * | 6/2014 | Platto | B60B 7/00 |
| | | | 301/37.101 |
| 2015/0069822 A1 * | 3/2015 | Haase | B60B 1/06 |
| | | | 301/37.101 |
| 2017/0043616 A1 * | 2/2017 | Wippler | B60B 3/10 |
| 2020/0338924 A1 | 10/2020 | Kim et al. | |
| 2025/0196531 A1 * | 6/2025 | Kim | B60B 7/20 |
| 2025/0229571 A1 * | 7/2025 | Harmon | B60B 7/04 |

FOREIGN PATENT DOCUMENTS

| KR | 10-2020-0124376 A | 11/2020 |
|---|---|---|
| KR | 10-2022-0016559 A | 2/2022 |
| KR | 10-2022-0036242 A | 3/2022 |

* cited by examiner

I-I'

WHEEL COVER WITH MOVEABLE VENT STRUCTURE

CROSS-REFERENCE TO RELATED APPLICATIONS

The present application claims priority to Korean Patent Application No. 10-2023-0024577 filed on Feb. 23, 2023, the entire contents of which is incorporated herein for all purposes by this reference.

BACKGROUND OF THE PRESENT DISCLOSURE

Field of the Present Disclosure

The present disclosure relates to a wheel cover.

Description of Related Art

Wheels may enhance an exterior aesthetic of a vehicle depending on the shape thereof, but may cause a difference in air resistance and cooling efficiency of brakes provided in the wheels. When the vehicle is traveling, air flowing in from the front of the vehicle may flow through an open space in a wheel, and the air flowing through the open space in the wheel may generate drag and may increase air resistance of the vehicle. The air resistance of a vehicle may be a factor directly affecting fuel efficiency of a vehicle, and it is known that air resistance generated by the wheel may account for about 25% of air resistance of the entire vehicle.

To reduce air resistance generated by a wheel, a method of reducing an open space (e.g., a space between spokes) of wheel may be used. However, when the open space of the wheel is reduced, cooling efficiency of a braking device mounted in the wheel of the vehicle may decrease, which may cause overheating of the braking device so that performance of the braking device may deteriorate.

To address the issue above, a device for opening or closing the open space between spokes of wheel using a driving device has been developed, but a driving device and power supplied to the driving device may be necessary. Also, an additional sensor and control connection may be necessary to control a device for opening or closing the open space between spokes of wheel depending on a driving state of the vehicle and the state of the braking device so that a system may be complicated.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a wheel cover which may actively open or close an open space of a wheel provided in a vehicle without a power supply.

According to an aspect of the present disclosure, a wheel cover includes a fixing unit fixed to a wheel of a vehicle, a variable unit coupled to and supported by the fixing unit and configured for being opened and closed, a first power unit configured to apply a first force acting on the variable unit, wherein the force changes depending on temperature, and a second power unit configured to apply a second force acting on the variable unit, wherein the second force changes depending on a wheel speed, wherein the variable unit is opened or closed depending on the first force generated by the first power unit and the second force generated by the second power unit.

The first power unit may include a thermally responsive elastic member of which elastic force changes depending on temperature.

In the thermally responsive elastic member, elastic force, generated based on a linear change in temperature, may change nonlinearly.

The first power unit may further include a heat transfer plate in contact with a braking device mounted on the wheel, and a heat transfer unit connected to the heat transfer plate and including a body portion enclosing the thermally responsive elastic member.

The variable unit may include a fixing unit coupling plate coupled to the fixing unit, a central plate coupled to the first power unit and the second power unit and configured for moving according to the first force generated by the first power unit and the second force generated by the second power unit, and a variable plate configured to connect the fixing unit coupling plate to the central plate and to open or close the variable unit according to movement of the central plate.

The central plate, the variable plate, and the fixing unit coupling plate may form a kirigami structure.

The first power unit may include a central plate coupled to the first power unit and the second power unit and configured to move according to the first force generated by the first power unit and the second force generated by the second power unit, the second power unit may include a weight connected to the central plate by a wire, and force acting on the variable unit may change by the weight rotating together with the wheel.

The second power unit may further include a guide slide configured to guide a movement path of the weight.

The second power unit may include an elastic member coupled to the weight and a portion of the guide slide and configured to provide an elastic force to the weight.

The variable unit may be open while the wheel is stopped.

The variable unit may be closed while the wheel is stopped.

According to an aspect of the present disclosure, a wheel cover may further include a fixing unit fixed to a wheel of a vehicle together with a braking device, a variable unit coupled to the fixing unit and configured for being opened and closed, a first power unit including a thermally responsive elastic member to generate force to the variable unit, and a second power unit including an elastic member to generate force to the variable unit, wherein the thermally responsive elastic member may non-linearly generate elastic force in a predetermined temperature range, and the elastic member may be configured to generate elastic force linearly with respect to a change in length.

The variable unit is a fixing unit coupling plate coupled to the fixing unit, a central plate coupled to the first power unit and the second power unit and configured to move in a direction of a rotation axis of the wheel, and a variable plate configured to connect the fixing unit coupling plate to the central plate and to open or close the variable unit according to movement of the central plate.

The variable unit may include a connection plate disposed between the central plate and the variable plate and rotatably coupled to each of the central plate and the variable plate.

The thermally responsive elastic member may be a leaf spring including a shape memory alloy.

The thermally responsive elastic member may be a coil spring including a shape memory alloy.

The first power unit may further include a heat transfer unit including a body portion enclosing the thermally responsive elastic member.

The wheel cover may further include a heat transfer plate in contact with the braking device, and a connection portion configured to connect the heat transfer plate to the body portion.

The thermally responsive elastic member may be configured to generate elastic force greater than elastic force of the elastic member in the predetermined temperature range.

The variable unit may be closed while the wheel is stopped.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
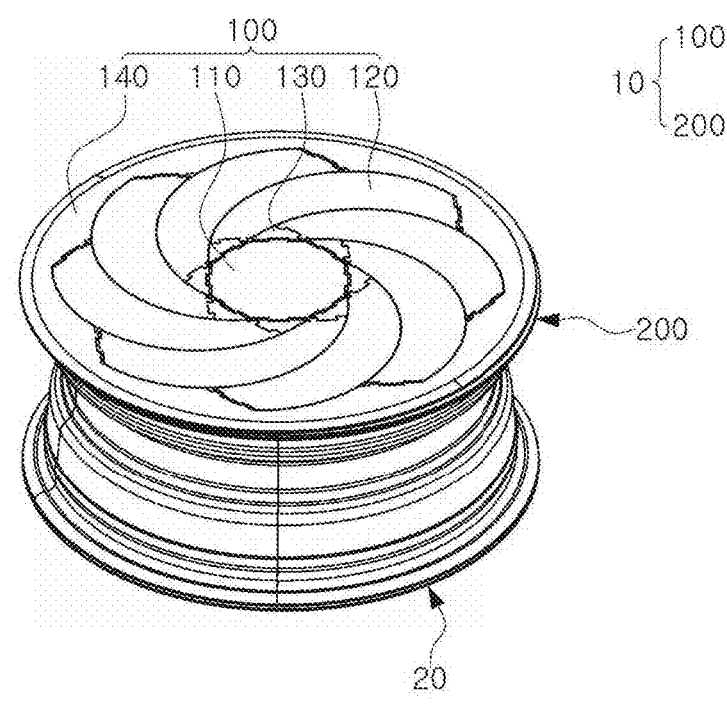
FIG. 1 is a perspective diagram illustrating a wheel including a wheel cover mounted thereon according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described with reference to the appended drawings.

Various embodiments will be described with reference to accompanying drawings. However, this does not necessarily limit the scope of the embodiments to a specific embodiment form. Instead, modifications, equivalents and replacements included in the included concept and technical scope of the present description may be employed. Throughout the specification, similar reference numerals are used for similar elements.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the embodiments.

The terms, "include," "comprise," "is configured to," or the like of the description are used to indicate the presence of features, numbers, steps, operations, elements, parts or combination thereof, and do not exclude the possibilities of combination or addition of one or more features, numbers, steps, operations, elements, parts or combination thereof.

Unless otherwise defined, all terms used herein, including technical or scientific terms, include the same meanings as those which would be generally understood by those with ordinary knowledge in the field of art to which the present disclosure belongs. Terms such as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
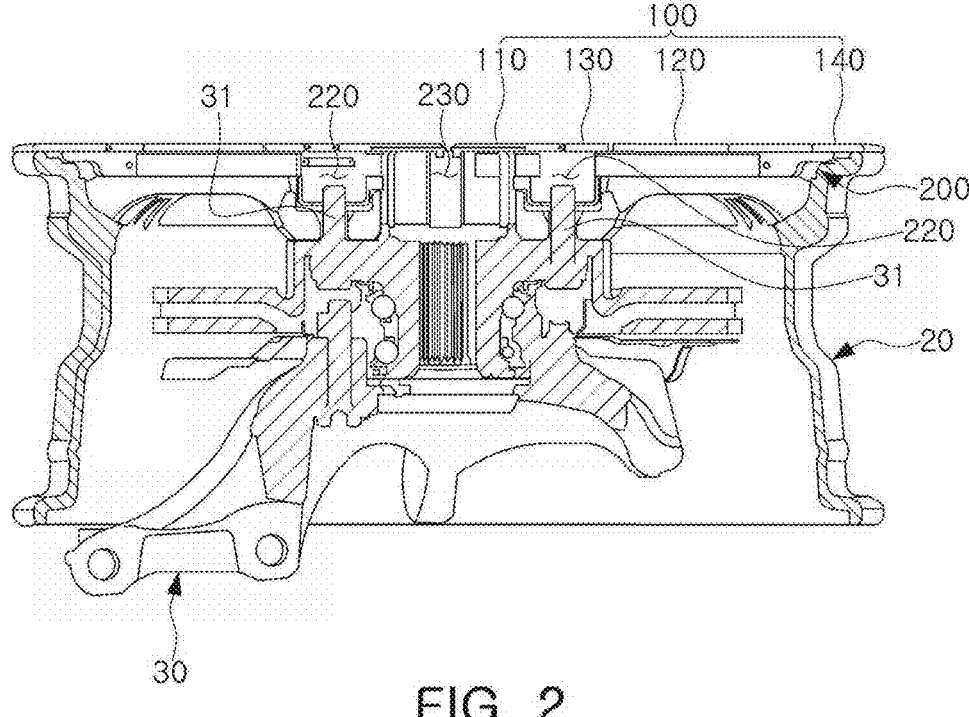
FIG. 2 is a cross-sectional diagram illustrating a wheel including a wheel cover mounted thereon according to an exemplary embodiment of the present disclosure.
Figure 3:
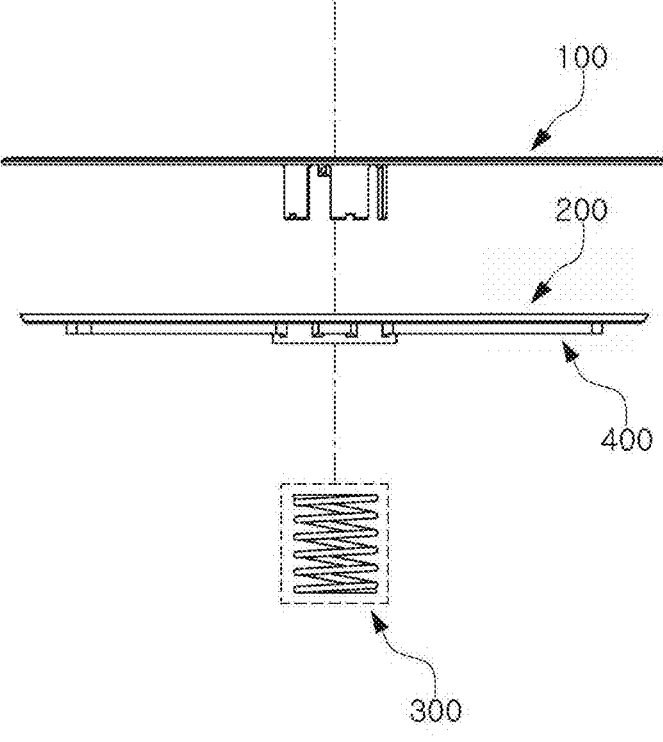
FIG. 3 is an exploded diagram illustrating a wheel cover mounted thereon according to an exemplary embodiment of the present disclosure.
Figure 4A:
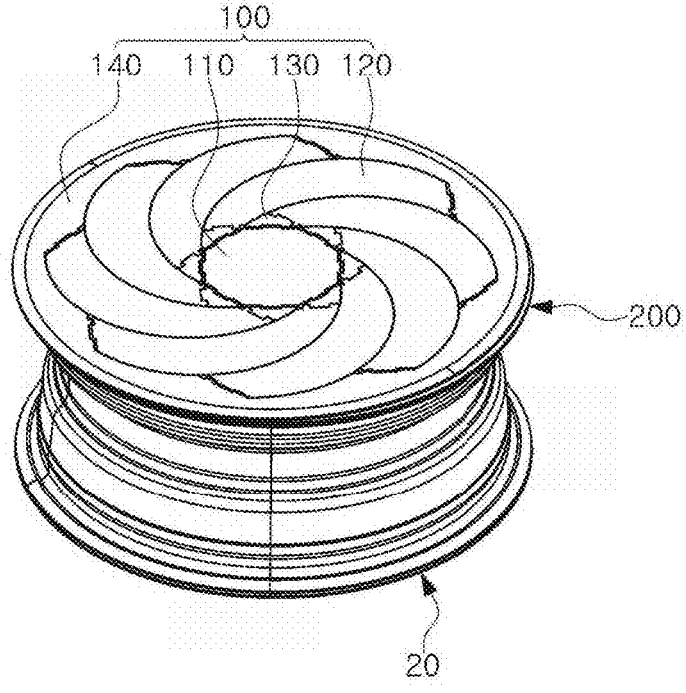
FIG. 4A and FIG. 4B are perspective diagrams illustrating a closed state (FIG. 4A) and an open state (FIG. 4B) of a wheel cover according to an exemplary embodiment of the present disclosure.
Figure 4B:
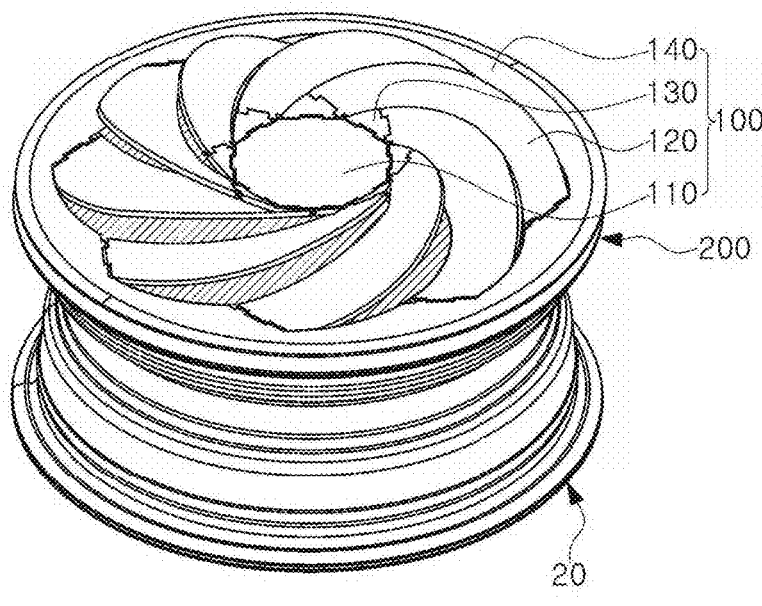
Figure 5:
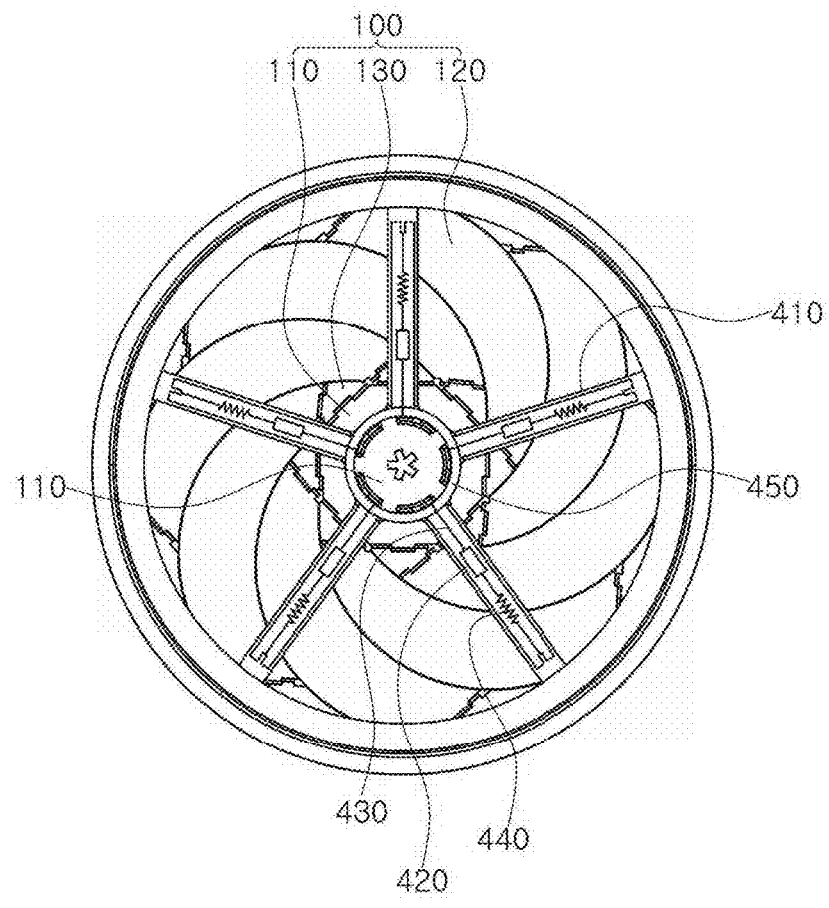
FIG. 5 is a diagram illustrating a wheel cover according to an exemplary embodiment of the present disclosure, viewed from below.
Figure 6:
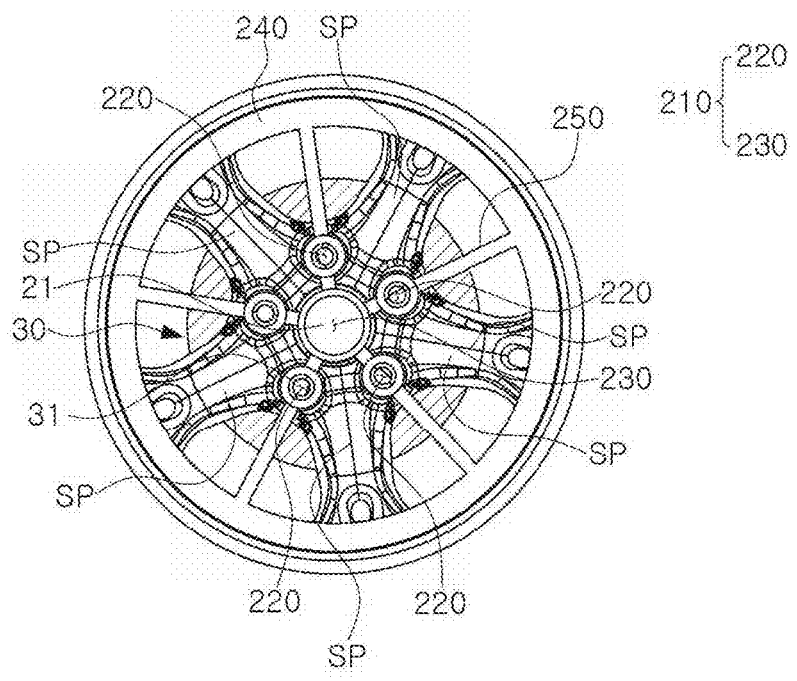
FIG. 6 is a diagram illustrating a state in which a fixing unit is mounted on a wheel according to an exemplary embodiment of the present disclosure.

FIG. 1 is a perspective diagram illustrating a wheel 20 including a wheel cover 10 mounted thereon according to an exemplary embodiment of the present disclosure. FIG. 2 is a cross-sectional diagram illustrating a wheel 20 including a wheel cover 10 mounted thereon according to an exemplary embodiment of the present disclosure. FIG. 3 is an exploded diagram illustrating a wheel cover 10 mounted thereon according to an exemplary embodiment of the present disclosure. FIG. 4A and FIG. 4B are perspective diagrams illustrating a closed state (FIG. 4A) and an open state (FIG. 4B) of a wheel cover 10 according to an exemplary embodiment of the present disclosure. FIG. 5 is a diagram illustrating a wheel cover according to an exemplary embodiment of the present disclosure, viewed from below. FIG. 6 is a diagram illustrating a state in which a fixing unit 200 is mounted on a wheel 20 according to an exemplary embodiment of the present disclosure.

Referring to FIG. 1 and FIG. 2, the wheel cover 10 according to the exemplary embodiment of the present disclosure may be coupled to the external side of the wheel 20 provided in the vehicle. The braking device 30 may be disposed on the internal side of the wheel 20 and may be coupled through the wheel 20 and the wheel bolt 31. The wheel cover 10 may be fixed using the wheel 20 and the wheel bolt 31. In other words, the braking device 30 and the wheel cover 10 may be coupled and fixed to the wheel 20 through the wheel bolt 31 with the wheel 20 interposed therebetween.

The wheel cover 10 according to the exemplary embodiment of the present disclosure may be coupled to the external side of the wheel 20 including the braking device 30 disposed on the internal side thereof, and may open or close the external side surface of the wheel 20, allowing air to flow through the wheel 20 or preventing the flow of air. Also, by fixing to the wheel using the wheel bolt 31, the wheel cover 10 may be mounted on the existing wheel 20 without modifying the wheel 20 provided in the existing vehicle so that compatibility may be high.

Referring to FIG. 3, the wheel cover 10 according to the exemplary embodiment of the present disclosure may include a variable unit 100 and a fixing unit 200. The shape of the variable unit 100 may change according to a rotation state of the wheel 20 or the temperature of the braking device 30. As a rotation speed of the wheel 20 increases, force may act in the direction in which the variable unit 100 is closed, and as the temperature of the braking device 30 increases, force opening the variable unit 100 may arise. The variable unit 100 may be opened or closed based on a balance between the force generated by the rotation speed of the wheel 20 and the force generated as the temperature of the braking device 30 increases.

The fixing unit 200 may be fixed to the wheel 20 and may rotate integrally with the wheel 20. The fixing unit 200 may support the variable unit 100 by being coupled with the variable unit 100 along a circumferential surface. That is, the fixing unit 200 is coupled to and supported by the variable unit 100 on one side surface, and the fixing unit 200 may be fixed to the wheel 20 on the other side surface so that the fixing unit 200 and the variable unit 100 may be attached to the wheel.

Referring to FIG. 4, the variable unit 100 may include a central plate 110, a variable plate 120, and a fixing unit coupling plate 140, and the central plate 110 and the variable plate 120 may form a kirigami structure. The variable unit 100 may include a substantially circular plate shape. The central plate 110 may include a substantially circular plate shape at the center portion of the variable unit 100. The central plate 110 may be connected to the second power unit 400 and the first power unit 300, which will be described later, and may move forwards and backwards along the axial direction of the wheel 20 according to forces generated by the second power unit 400 and the first power unit 300.

The fixing unit coupling plate 140 may be separated from the external circumferential surface of the fixing unit 200 to the internal side and may be fixed through a bolt penetrating a coupling hole formed along the circumference and a nut fixing the same. However, an exemplary embodiment thereof is not limited thereto, and various known fixing members may be applied in addition to bolts and nuts. The fixing unit coupling plate 140 may be coupled to the fixing unit 200 to support the variable unit 100, and may be fixed to the wheel 20 to rotate together with the rotating fixing unit 200.

The variable plate 120 may have one side coupled to the circumferential surface of the central plate 110 and the other side coupled to the internal circumferential surface of the fixing unit coupling plate 140. The variable plate 120 may be rotatably coupled to the central plate 110 or the fixing unit coupling plate 140 through pins. However, an exemplary embodiment thereof is not limited thereto, and the variable plate 120 may be coupled to various rotatable coupling members such as hinges. Here, the variable plate 120 may include a plurality of plates including a spiral shape. The variable plate 120 may connect the central plate 110 to the fixing unit coupling plate 140, and the variable plate 120, the central plate 110, and the fixing unit coupling plate 140 may be coupled to each other and may form a kirigami structure. When the central plate 110 and the fixing unit coupling plate 140 are present on the same plane, the variable unit 100, the central plate 110, the variable plate 120, and the fixing unit coupling plate 140 may form a circular plate, and air flow to flow into the wheel 20 through the variable unit 100 may be blocked. Furthermore, when the central plate 110 moves along the axial direction of the wheel 20, the central plate 110 and the fixing unit coupling plate 140 may be present on a plane in different positions, and the central plate 110 and the fixing unit coupling plate 140 may be connected to the variable plate 120. In the instant case, a space may be formed between the variable plates 120 so that air may flow through the variable unit 100 and may flow to the internal side of the wheel 20. Here, the shape of the variable plate 120 may form a kirigami structure including a spiral line toward the central plate 110. Depending on the shape and angle formed by the variable plate 120, the variable plate 120 may function as a turbine structure, and may efficiently discharge the heated air in to the external side thereof.

However, an exemplary embodiment thereof is not limited thereto, and the kirigami structure formed by the variable plate 120 may be designed and manufactured to have various shapes and angles.

Also, a connection plate 130 provided between the central plate 110 and the variable plate 120 may be further included according to elastic force of the material forming the variable unit 100. When the material forming the variable unit 100 is elastic, the variable plate 120 may expand and reduce without a connection plate 130, and the central plate 110 may move back and forth along the axial direction of the wheel 20.

When the material forming the variable unit 100 is not elastic, even when force is applied to the central plate 110, variable unit 100 may be bound to the central plate 110 and the fixing unit coupling plate 140 so that the variable plate 120 may not change. Accordingly, the variable unit 100 may further include a connection plate 130 to compensate for insufficient elastic force. The connection plate 130 may be disposed between the central plate 110 and the variable plate 120 and may be rotatably coupled to each of the central plate 110 and the variable plate 120. The connection plate 130 may allow the central plate 110, the variable plate 120, and the fixing unit coupling plate 140 to move flexibly so that the central plate 110, the variable plate 120, the connection plate 130 and the fixing unit coupling plate 140 formed of materials lacking elastic force may be naturally deformed. When the central plate 110 rises, the central plate 110, the variable plate 120, the connection plate 130 and the fixing unit coupling plate 140 coupled to each other to be rotatable may change shapes thereof through a coupling portion through which the central plate 110, the variable plate 120, the connection plate 130 and the fixing unit coupling plate 140 may relatively rotate according to the movement of the central plate 110. The wheel cover even when according to the exemplary embodiment of the present disclosure may form a kirigami structure even without elastic force using the central plate 110, the variable plate 120, the connection plate 130 and the fixing unit coupling plate 140 rotatably coupled to each other. However, the position of the connection plate 130 may not be limited thereto. The connection plate 130 may be disposed between the fixing unit coupling plate 140 and the variable plate 120 and may be rotatably coupled to each of the fixing unit coupling plate 140 and the variable plate 120. Also, one or more connection plates 130 may be disposed between the central plate 110 and the variable plate 120 or between the fixing unit coupling plate 140 and the variable plate 120. When the material forming the variable unit 100 is not elastic, when more connection plates 130 are placed, force limiting the movement of the central plate 110 may be reduced, but additional components (e.g., the addition of a hinge coupling portion) and process may be added. Accordingly, the number of connection plates 130 may be appropriately selected in consideration of characteristics of the material and the manufacturing process.

Referring to FIG. 5 and FIG. 6, the fixing unit 200 may include a wheel coupling unit 210, a variable unit coupling plate 240, and a support unit 250.

The wheel coupling unit 210 may include a first coupling hole 220 formed in a position corresponding to the wheel bolt 31, and a second coupling hole 230 formed at least greater than the direct diameter of the shaft 21 in the center portion. The wheel coupling unit 210 may be coupled to the wheel 20 and the braking device 30 through the first coupling hole 220 and the wheel bolt 31, so that the deformation of the existing wheel 20 may be reduced using the coupling portion of the existing wheel 20 as is, possibility of compatibility with the existing wheel 20 may increase, and an increase in weight may be prevented as additional components for mounting the wheel cover is not necessary. Also, by forming the second coupling hole 230, the wheel coupling unit 210 may not interfere with the shaft 21 while rotating together with the wheel 20. Also, the first power unit 300 and the second power unit 400 to be described later may be connected to the central plate 110 of the variable unit 100 through the second coupling hole 230.

The variable unit coupling plate 240 may be coupled to the fixing unit coupling plate 140 of the variable unit 100 and may support the variable unit 100. The variable unit coupling plate 240 may be a donut-shaped disk including a shape corresponding to the fixing unit coupling plate 140. The variable unit coupling plate 240 may be coupled to the fixing unit coupling plate 140 and may rotate integrally. The variable unit coupling plate 240 and the fixing unit coupling plate 140 may form coupling holes in positions corresponding to each other, and may be coupled through bolts penetrating the coupling holes and nuts fixing the bolts. However, an exemplary embodiment thereof is not limited thereto, and the variable unit coupling plate 240 and the fixing unit coupling plate 140 may be fixed using various known techniques such as rivet coupling.

The support unit 250 may connect the wheel coupling unit 210 to the variable unit coupling plate 240 and may support the wheel coupling unit 210 to the variable unit coupling plate 240. The support unit 250 may be disposed in a space between the spokes SP of the wheel 20 and may be in a form of a plate including a predetermined thickness and length. One side of the support unit 250 may be fixed to the wheel coupling unit 210 and the other side may be fixed to the variable unit coupling plate 240. When the wheel coupling unit 210 rotates together with the wheel 20, the variable unit coupling plate 240 connected through the support unit 250, the variable unit coupling plate 240 and the wheel coupling unit 210 may rotate with the wheel 20.

Figure 7:
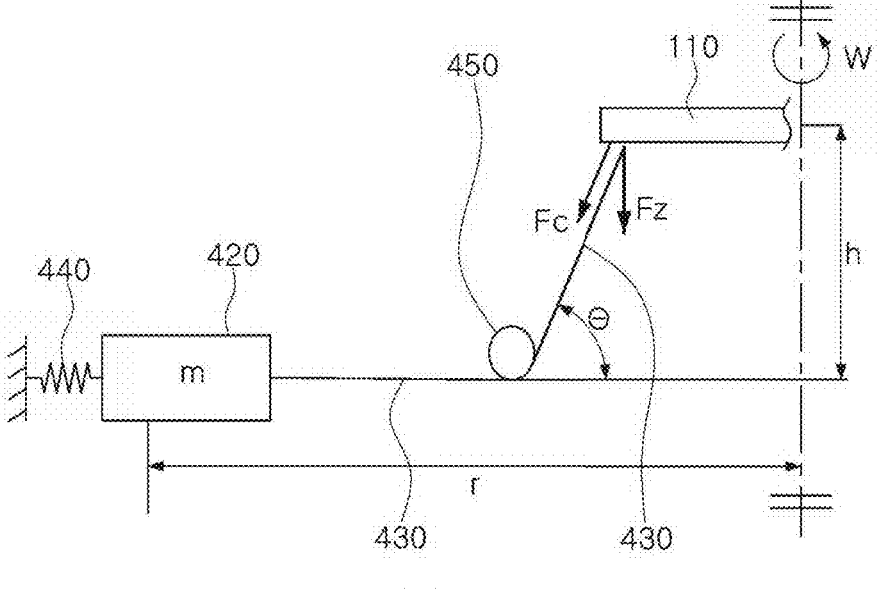
FIG. 7 is a diagram illustrating a second power unit according to an exemplary embodiment of the present disclosure.

FIG. 7 is a diagram illustrating a second power unit 400 according to an exemplary embodiment of the present disclosure.

Referring to FIG. 7, the wheel cover 10 according to the exemplary embodiment of the present disclosure may include a second power unit 400. The second power unit 400 may be configured to close the wheel cover 10 based on a change in the magnitude of centrifugal force generated as the wheel 20 rotates. The second power unit 400 may include a guide slide 410, a weight 420, an elastic member 440, and a wire 430.

The second power unit 400 may include a wire 430 including one end portion fixed to a portion of the lower surface of the central plate 110 and the other end portion connected to the elastic member 440, and the elastic member 440 connected to the wire 430. An elastic member 440 including one end portion coupled to the wire 430 and the other end portion fixed to a portion of the variable unit coupling plate 240 may be included. The elastic member 440 may form elastic force so that the central plate 110 may move in a direction to close the wheel cover 10.

The weight 420 may be disposed between the wire 430 and the elastic member 440. The weight 420 may generate centrifugal force corresponding to the rotation speed of the wheel 20 of the vehicle, adjusting the force acting to move the central plate 110 in the direction of closing the wheel cover 10. Here, the elastic member 440 may allow the elastic force to act in the same direction as the centrifugal force of the weight 420, and may also continuously apply the elastic force to the weight 420 so that the weight 420 may be prevented from deviating from the path or vibrating excessively.

The guide slide 410 may prevent the wire 430 and elastic member 440 connected to both sides of the weight 420, which may linearly move back and forth according to the position of the central plate 110, from deviating from the path, vibrating excessively, or colliding with other components. The guide slide 410 may be disposed below the support unit 250 to reduce obstruction of the air flow through the space between the spokes SP when the variable unit 100 is opened. However, an exemplary embodiment thereof is not limited thereto, and the guide slide 410 may be disposed spaced from the support unit 250 in the space between the spokes SP.

The second power unit 400 may further include a wear prevention unit 450. The wear prevention unit 450 may connect the weight 420 to the central plate 110 so that the wire 430 moving together with the weight 420 and the central plate 110 may move smoothly, and abrasion due to repetitive movement of the wire 430 may be prevented. The wear prevention unit 450 may include an annular shape including a larger external diameter than that of the central plate 110. The wire 430 may have different moving paths in contact with the wear prevention unit 450. For example, the wire 430 moves between the wear prevention unit 450 and the central plate 110 with a vertical component with respect to the guide slide 410, and may move along the guide slide 410 between the wear prevention unit 450 and the weight 420. That is, the wire 430 may move together with the weight 420 and the central plate 110, and may be supported by and in contact with the wear prevention unit 450 so that the moving direction may change. Accordingly, as the weight 420 and the central plate 110 move, the wire 430 may repeatedly rub against the wear prevention unit 450, and the wear prevention unit 450 may include an annular shape including a predetermined thickness to reduce friction with the wire 430 and to sufficiently withstand wear. The wear prevention unit 450 may include a shape of a roller allowing the wire 430 to naturally move, and various components for preventing wear of the second power unit 400 by the wire 430 may be applied.

Referring to FIG. 7, the force generated by the second power unit 400 to close the variable unit 100 may be proportional to the centrifugal force generated by the weight 420. When the force generated by the weight 420 may be represented by in Equation 1 as below:

$$F_z = F_c \cdot \sin(\theta) = m \cdot r \cdot w^2 \cdot \sin(\theta) = m \cdot (r_0 - h) \cdot w^2 \cdot \sin(\theta) \qquad \text{[Equation 1]}$$

Here, $F_z$ may be the force to close the variable unit 100 acting on the center portion, $F_c$ may be the centrifugal force generated by the weight 420, w may be the rotation speed of the wheel 20, r may be the distance from the center of rotation to the weight 420 in a rotating state, $r_0$ may be the distance from the center of rotation of the variable unit 100 to the weight 420 in a closed state, h may be the height difference between the weight 420 and the central plate 110, m may be the mass of weight 420, and θ may be an angle of force applied to the central plate 110 by the wire 430.

Figure 8A:
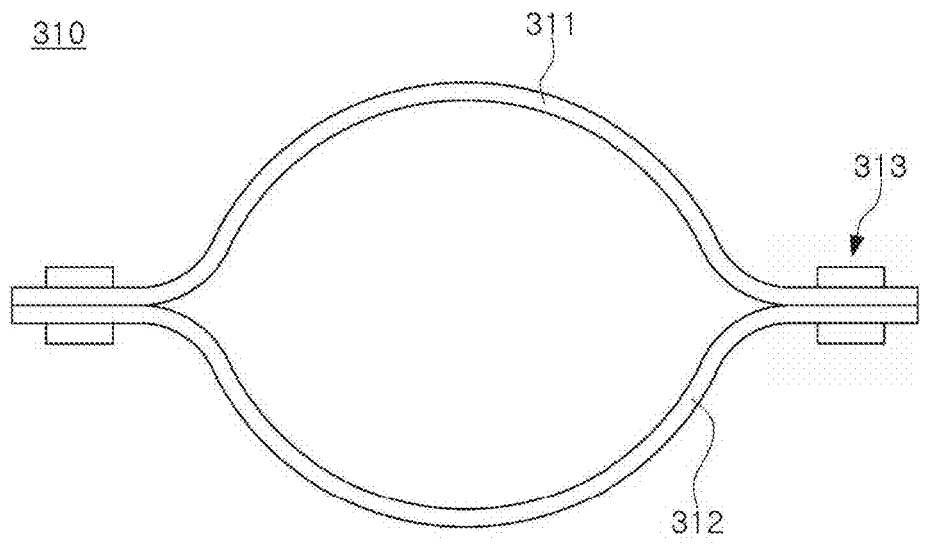
FIG. 8A is a diagram illustrating a thermo-responsive elastic member in a form of a leaf spring according to an exemplary embodiment of the present disclosure.
Figure 8B:
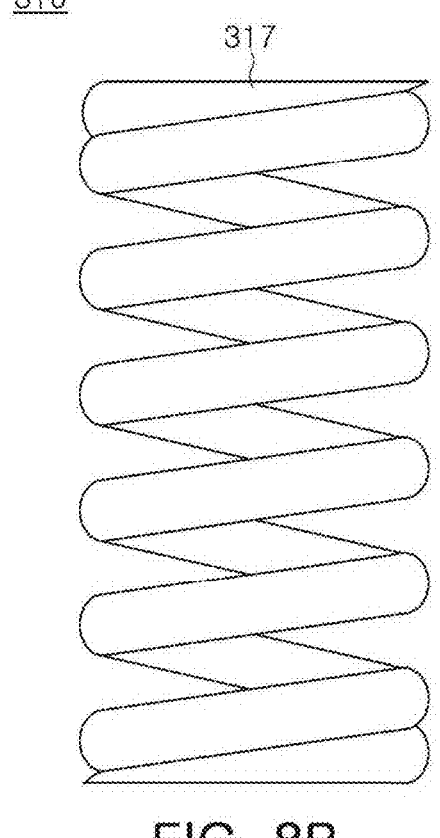
FIG. 8B is a diagram illustrating a thermo-responsive elastic member in a form of a coil spring according to an exemplary embodiment of the present disclosure.
Figure 9:
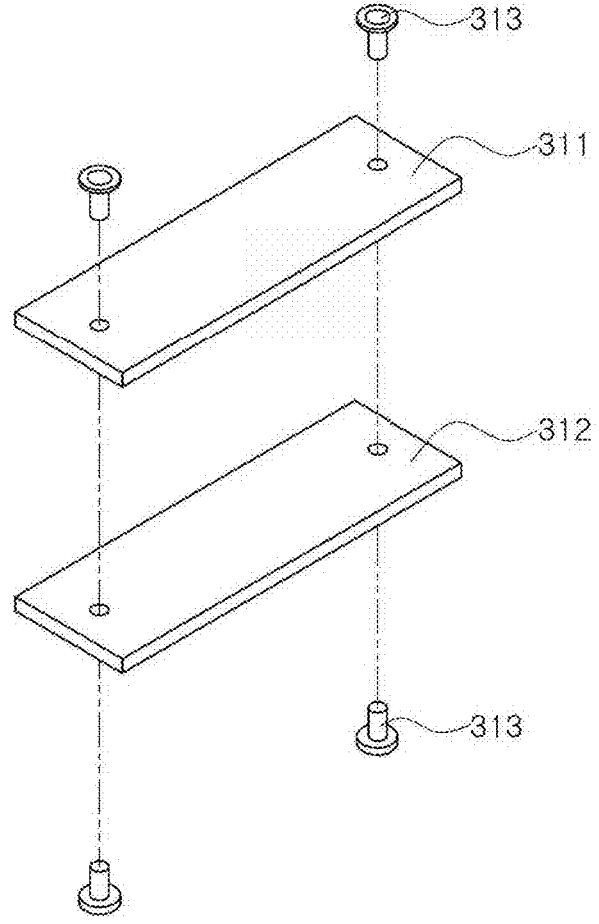
FIG. 9 is an exploded diagram illustrating a thermo-responsive elastic member in a form of a leaf spring according to an exemplary embodiment of the present disclosure.
Figure 10A:
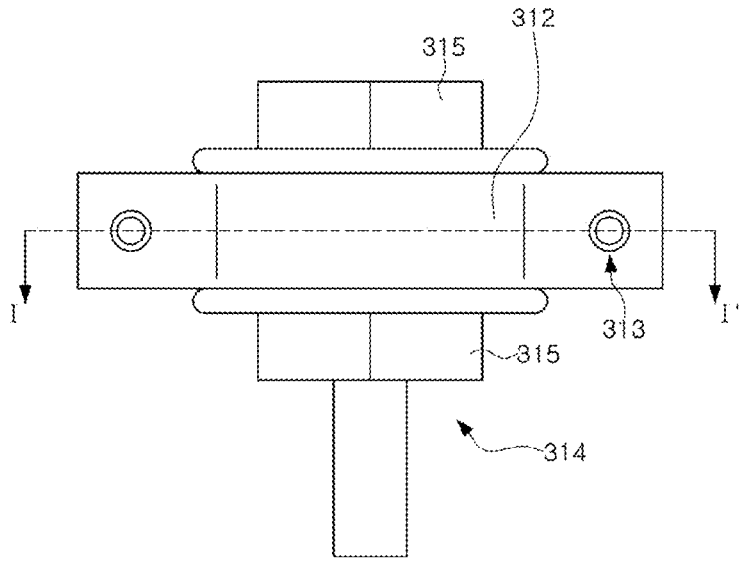
FIG. 10A and FIG. 10B are diagrams illustrating a process of manufacturing a thermo-responsive elastic member in a form of a leaf spring according to an exemplary embodiment of the present disclosure.
Figure 10B:
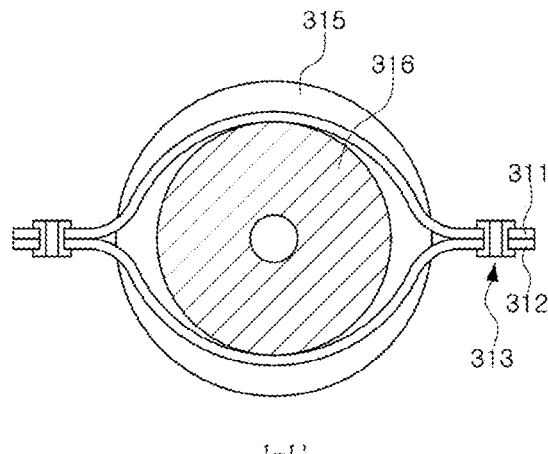
Figure 11:
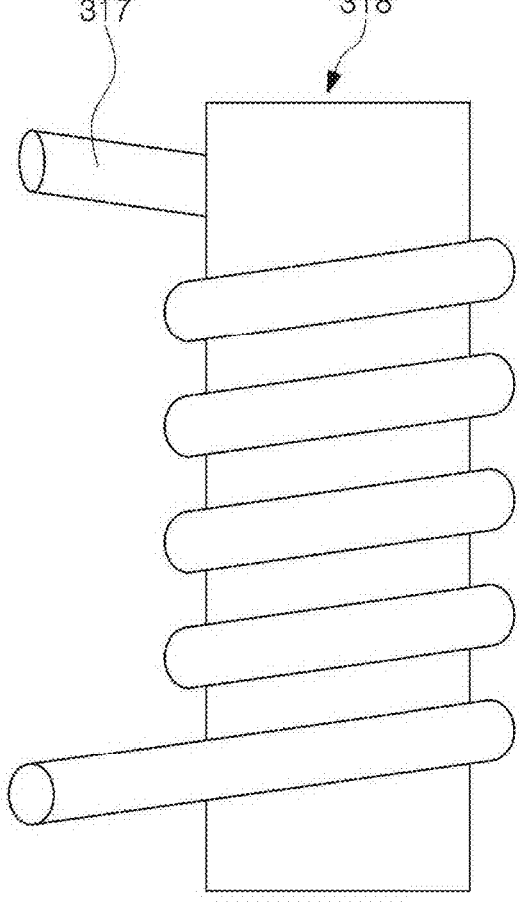
FIG. 11 is a diagram illustrating a process of manufacturing a thermo-responsive elastic member in a form of a coil spring according to an exemplary embodiment of the present disclosure.
Figure 12:
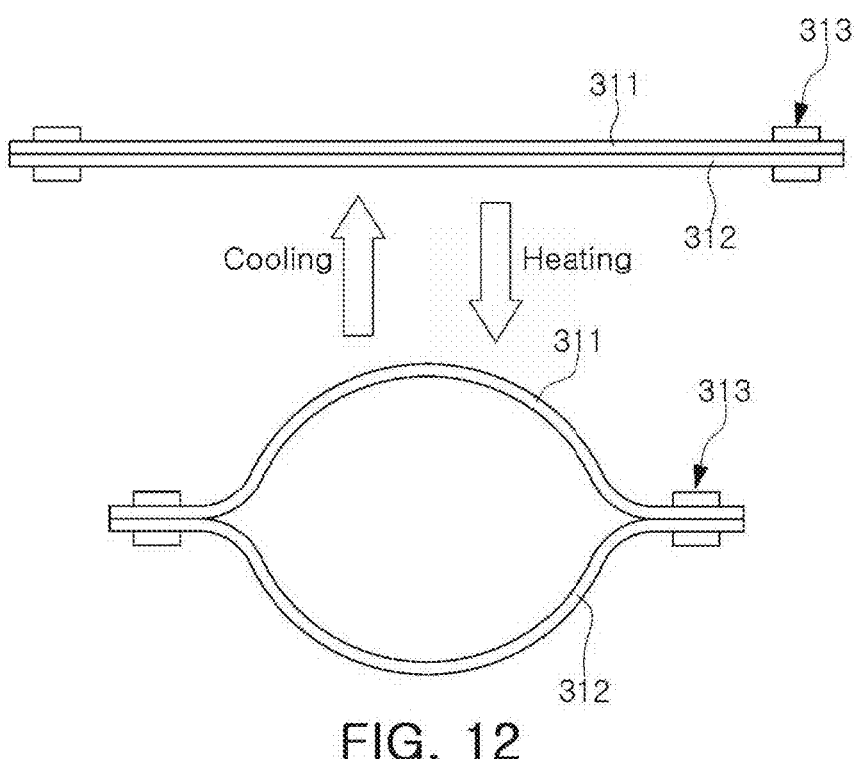
FIG. 12 is a diagram illustrating a change in form of a thermo-responsive elastic member including a form of leaf spring depending on temperature according to an exemplary embodiment of the present disclosure.
Figure 13:
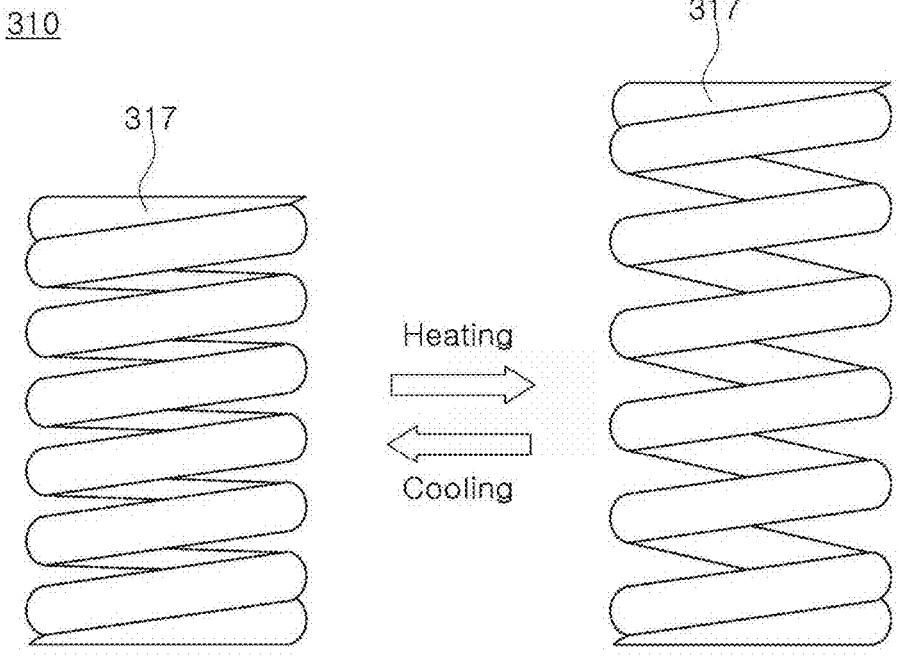
FIG. 13 is a diagram illustrating a change in form of a thermo-responsive elastic member including a form of coil spring depending on temperature according to an exemplary embodiment of the present disclosure.

FIG. 8A is a diagram illustrating a thermo-responsive elastic member in a form of a leaf spring according to an exemplary embodiment of the present disclosure. FIG. 8B is a diagram illustrating a thermo-responsive elastic member in a form of a coil spring according to an exemplary embodiment of the present disclosure. FIG. 9 is an exploded diagram illustrating a thermo-responsive elastic member 310 in a form of a leaf spring according to an exemplary embodiment of the present disclosure. FIG. 10A and FIG. 10B are diagrams illustrating a process of manufacturing a thermo-responsive elastic member 310 in a form of a leaf spring according to an exemplary embodiment of the present disclosure. FIG. 11 is a diagram illustrating a process of manufacturing a thermo-responsive elastic member 310 in a form of a coil spring according to an exemplary embodiment of the present disclosure. FIG. 12 is a diagram illustrating a change in form of a thermo-responsive elastic member 310 including a form of leaf spring depending on temperature according to an exemplary embodiment of the present disclosure. FIG. 13 is a diagram illustrating a change in form of a thermo-responsive elastic member 310 including a form of coil spring depending on temperature according to an exemplary embodiment of the present disclosure.

The wheel cover 10 according to the exemplary embodiment of the present disclosure may include a first power unit 300. The first power unit 300 may be configured to generate force to move the central plate 110 so that the variable unit 100 may be opened. In other words, the second power unit 400 may be configured to generate force to move the central plate 110 in the direction in which the variable unit 100 is closed, and the first power unit 300 may be configured to generate force to move the central plate 110 in a direction in which the variable unit 100 is opened. The variable unit 100 may be opened or closed due to a difference in power generated by the first power unit 300 and the second power unit 400. For example, when the force generated by the second power unit 400 is greater than the force generated by the first power unit 300, and when the force generated by the first power unit 300 is greater than the force generated by the second power unit 400, the variable unit 100 may be opened.

The first power unit 300 may include a thermally responsive elastic member 310 provided below the central plate 110. The elastic force of the thermally responsive elastic member 310 acting on the central plate may change depending on temperature. The thermally responsive elastic member 310 may be formed of a material of which shape changes in a specific temperature range (e.g., nickel-titanium shape memory alloy (SMA)). The elastic force generated by the thermally responsive elastic member 310 may change nonlinearly with respect to temperature. For example, the shape of the thermally responsive elastic member 310 may change in a specific temperature range determined according to a heat treatment process for manufacturing the thermally responsive elastic member 310, and accordingly, elastic force generated by the thermally responsive elastic member 310 may rapidly increase within a predetermined temperature range.

However, the thermally responsive elastic member is not limited to a shape memory alloy and may be formed of various materials of which shape changes with temperature. For example, the thermally responsive elastic member may be formed of bi-metal. Here, the bimetal may be formed by overlapping and attaching two types of thin metals including different degrees of expansion and reduction depending on temperature changes, and may be a material bending to one side when the temperature changes due to different coefficients of thermal expansion. As for the bimetal, when the temperature rises, a metal plate including a high thermal expansion coefficient may expand more and may be bent to the side with a small thermal expansion coefficient, and when the temperature decreases, the plate may be restored to an original state thereof. Accordingly, the bimetal may be manufactured to be bent at a predetermined temperature, and the first power unit including the bimetal may open the variable unit at a predetermined temperature by deformation of the bimetal.

Referring to FIGS. 8A and 8B, the thermally responsive elastic member 310 may include a leaf spring shape and a coil spring shape.

Referring to FIGS. 8A, 9, 10A and 10B, the thermally responsive elastic member 310 in a form of a leaf spring may be formed of different materials, may include a first plate 311 and a second plate 312 in a form of plates including shapes corresponding to each other, and the first plate 311 and the second plate 312 may be fixed using fixing members 313 on both sides of the first plate 311 and the second plate 312. The fixing member 313 may be a rivet, but an exemplary embodiment thereof is not limited thereto, and various known means for coupling the two plates, such as bolt and nut coupling, may be used.

The thermally responsive elastic member 310 in a form of a leaf spring may be heat treated while being fixed to the first jig 314 so that the shape may be changed in a target temperature range. Here, referring to FIG. 10, both side ends of the first plate 311 and the second plate 312 may be coupled to each other through the fixing member 313 in a state in which the height adjusting member 316 of the first jig 314 is disposed therebetween. Here, by adjusting the size of the height adjusting member 316, the height formed by the change of the thermally responsive elastic member 310 in a form of a leaf spring in a specific temperature range may be adjusted. Also, by coupling the flange nuts 315 to both sides of the height adjusting member 316, the first plate 311 and the second plate 312 may be prevented from being separated during the heat treatment process. Through the above-described process, the first plate 311 and the second plate 312 may be heat-treated while the first plate 311 and the second plate 312 are fixed to the first jig 314. Here, the first plate 311 and the second plate 312 fixed to the first jig 314 may be enclosed with a member (e.g., aluminum foil) for preventing oxidation, may be inserted into an electric furnace and may be heated so that oxidation of the first plate 311 and the second plate 312 may be prevented during the heat treatment process. Here, the first plate 311 and the second plate 312 fixed to the first jig 314 with a member preventing oxidation (e.g., aluminum foil) may be heat-treated for 30 minutes at 500 degrees Celsius in an electric furnace, and thereafter, the plates may be heat-treated by cooling at room temperature (approximately 25 degrees Celsius). The thermally responsive elastic member 310 in a form of a leaf spring formed through the above process may rapidly change a shape thereof between approximately 30 degrees and 50 degrees. However, an exemplary embodiment thereof is not limited thereto, and the heat treatment temperature and heat treatment holding time of the thermally responsive elastic member 310 may be varied depending on the type of material of the thermally responsive elastic member 310 and the target deformation temperature.

Referring to FIG. 11 together with FIG. 8B, the thermally responsive elastic member 310 may include a coil spring shape. The thermally responsive elastic member 310 in a form of a coil spring may be manufactured by heating a shape memory alloy wire 317 by winding the wire around a cylindrical second jig 318 in which a spiral groove is formed. Here, the spiral groove formed in the second jig 318 may be formed as a spiral groove including various widths according to a target height of the thermally responsive elastic member 310 and the required elastic force. After enclosing the shape memory alloy wire 317 wound along the spiral groove of the second jig 318 with a member for preventing oxidation along with the second jig 318, the wire may be inserted into an electric furnace, may be heat-treated at 500 degrees Celsius for 30 minutes, and may be cooled at room temperature (approximately 25 degrees Celsius). The temperature and heat treatment time applied in the heat treatment process are not limited thereto, and may be varied according to the type of material of the thermally responsive elastic member 310 and the target deformation temperature.

Referring to FIG. 12, and FIG. 13, shapes of the thermally responsive elastic member 310 in a form of a leaf spring or the thermally responsive elastic member 310 in a form of a coil spring may change based on the temperature changing according to heat generated by the braking device. The thermally responsive elastic member 310 may generate more force to return to an original shape thereof in a predetermined temperature range so that the elastic force may rapidly increase nonlinearly. Referring to FIG. 12, in the thermally responsive elastic member 310 in a form of a leaf spring, in a state in which no heat is applied, one surfaces of the first plate 311 and the second plate 312 may be in contact with each other. When a predetermined level of heat is applied to the thermally responsive elastic member 310 in a form of a leaf spring, the first plate 311 and the second plate 312 are deformed in a form of being spaced from each other while both end portions are coupled to each other so that elastic force may be generated. Here, according to the experimental results, it was confirmed that the elastic modulus increased in proportion to the number of stacked thermally responsive elastic members 310 in a form of leaf springs when stacked vertically. Accordingly, by adjusting the number of the thermally responsive elastic members 310 in a form of leaf springs, the required elastic force may be secured.

Also, the thermally responsive elastic member 310 in a form of a coil spring, which was in a compressed state in a predetermined temperature range, may generate force to return to the length of the heat treatment state, that is, to a state before being compressed. Accordingly, the elastic force of the thermally responsive elastic member 310 in a form of a coil spring may rapidly increase in a predetermined temperature range.

After heating for 30 minutes at 500 degrees Celsius through an electric furnace, performance of the thermally responsive elastic member 310 performed by cooling at room temperature was tested. According to the result, the thermally responsive elastic member 310 was rapidly deformed between about 30 degrees Celsius and about 50 degrees Celsius, and the deformation was completed at about 70 degrees Celsius. Here, the performance test of the thermally responsive elastic member 310 was performed by adjusting the temperature of the water in a state in which the thermally responsive elastic member 310 was placed in water so that heat was constantly applied to the thermally responsive elastic member 310, and the test was conducted while monitoring the temperature of the water in real time through the temperature sensor. A weight was provided on the upper end portion of the thermally responsive elastic member 310, and the test was conducted while heating water and observing changes in the thermally responsive elastic member 310. Here, the test was repeatedly performed while changing the weight of the weight on the upper end portion of the thermally responsive elastic member 310, and the lifting distance and heating time of the weight changed by the thermally responsive elastic member 310 according to the weight of the weight was observed to test the performance of the thermally responsive elastic member 310.

Figure 14A:
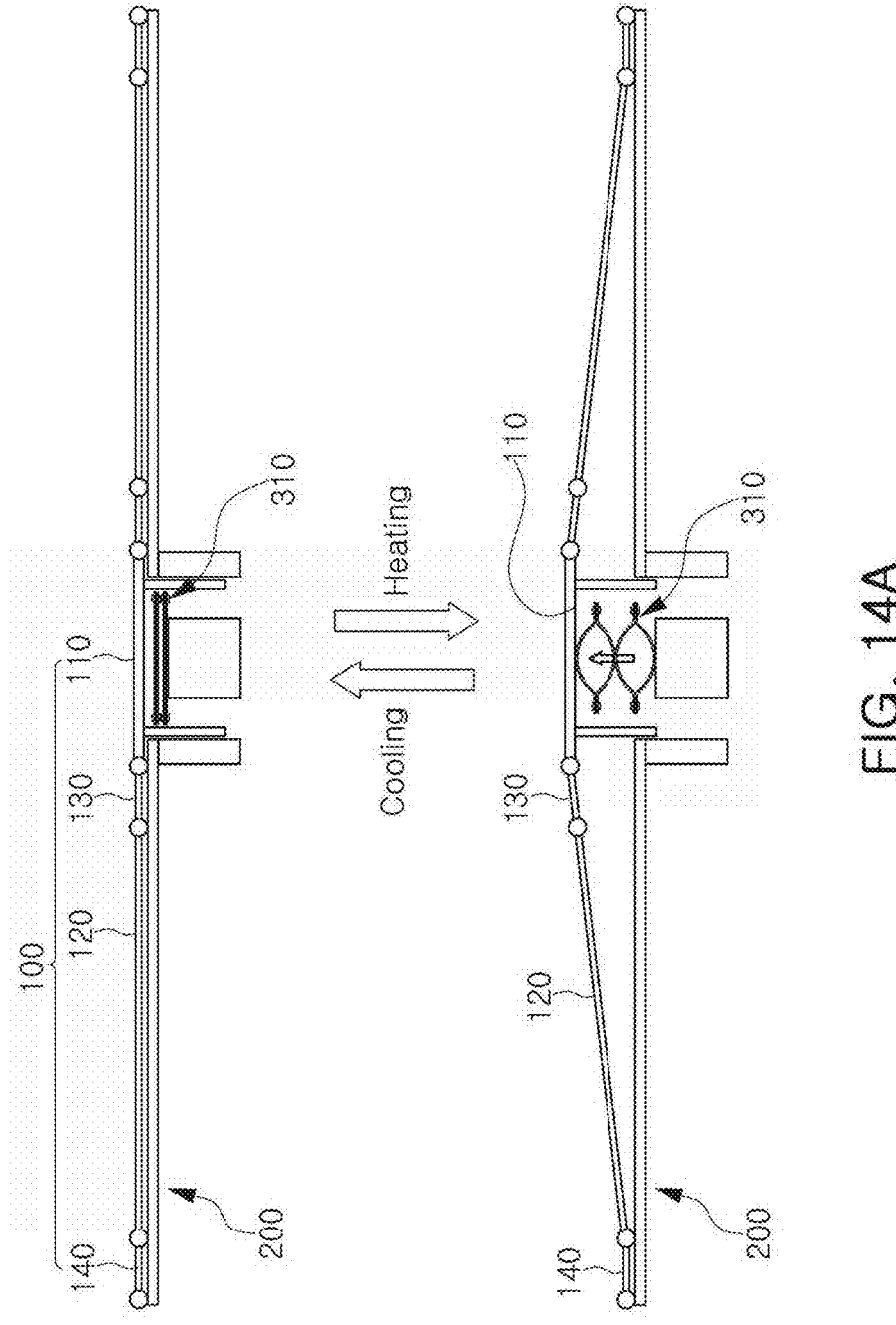
FIG. 14A is a diagram illustrating an operation of a first power unit including a thermo-responsive elastic member in a form of a leaf spring according to an exemplary embodiment of the present disclosure.
Figure 14B:
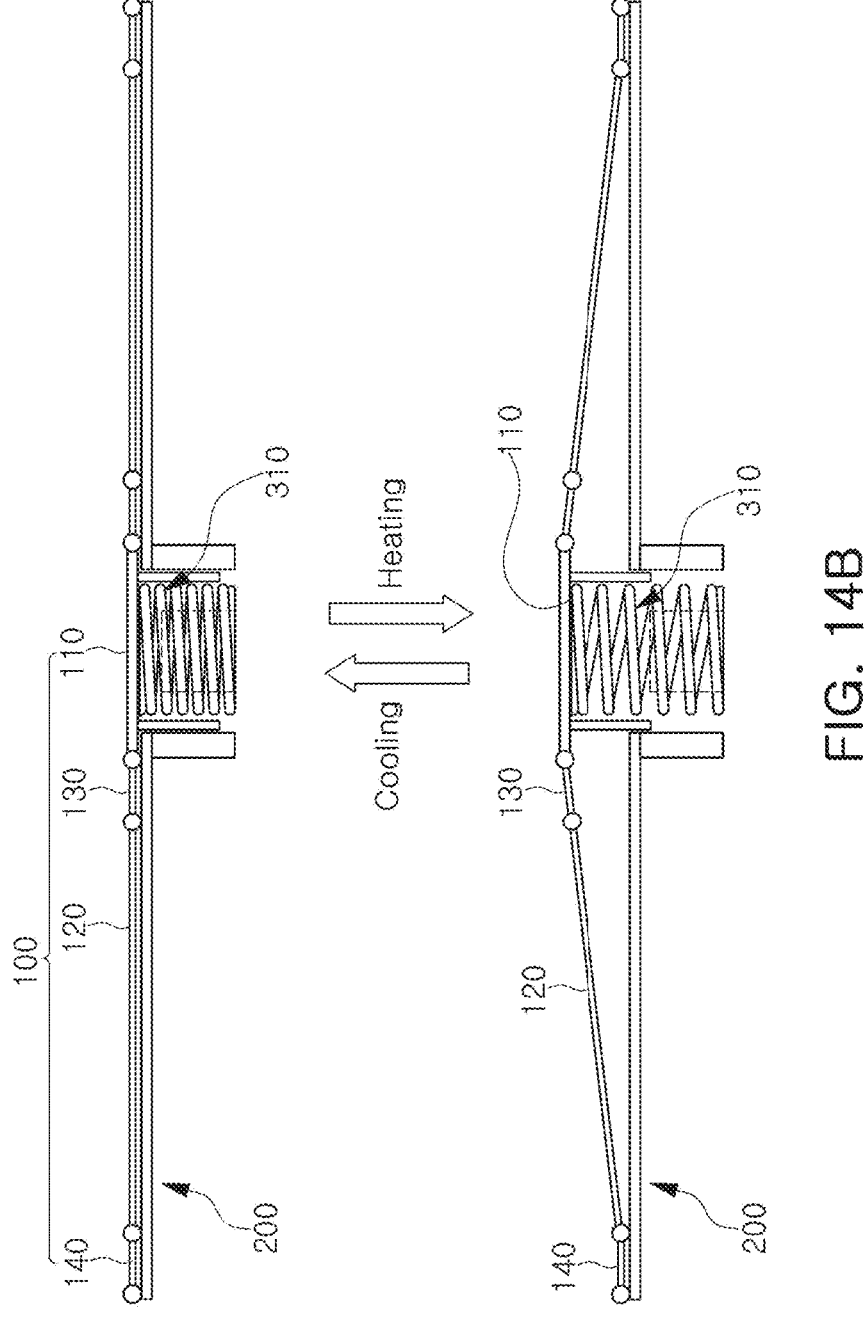
FIG. 14B is a diagram illustrating an operation of a first power unit including a thermo-responsive elastic member in a form of a leaf spring according to an exemplary embodiment of the present disclosure.

FIG. 14A is a diagram illustrating an operation of a first power unit 300 including a thermo-responsive elastic member 310 in a form of a leaf spring according to an exemplary embodiment of the present disclosure. FIG. 14B is a diagram illustrating an operation of a first power unit 300 including a thermo-responsive elastic member 310 in a form of a leaf spring according to an exemplary embodiment of the present disclosure.

As illustrated exemplarily in FIG. 14A, the thermally responsive elastic members 310 in a form of leaf springs may be vertically stacked. In the instant case, the elastic modulus of the two stacked thermally responsive elastic members 310 may be twice the elastic modulus of one thermally responsive elastic member 310. In other words, the thermally responsive elastic member 310 in a form of a leaf spring may increase the modulus of elastic force in proportion to the number of the stacked thermally responsive elastic members 310. Accordingly, the elastic force generated by a predetermined temperature range may be adjusted through the number of thermally responsive elastic members 310 in a form of leaf springs. As illustrated in FIG. 14A and FIG. 14B, shapes of both the thermally responsive elastic members 310 in a form of a leaf spring and a coil spring may change in a predetermined range of temperature, and the variable unit 100 may be opened by raising the central plate 110 through the changed shape in a predetermined range of temperature.

Figure 15A:
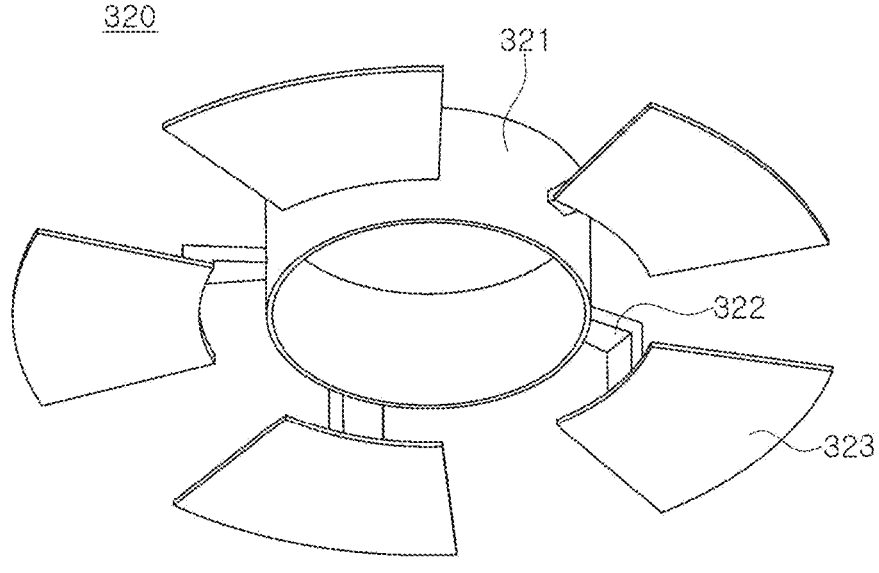
FIG. 15A and FIG. 15B are diagrams illustrating a heat transfer unit according to an exemplary embodiment of the present disclosure.
Figure 15B:
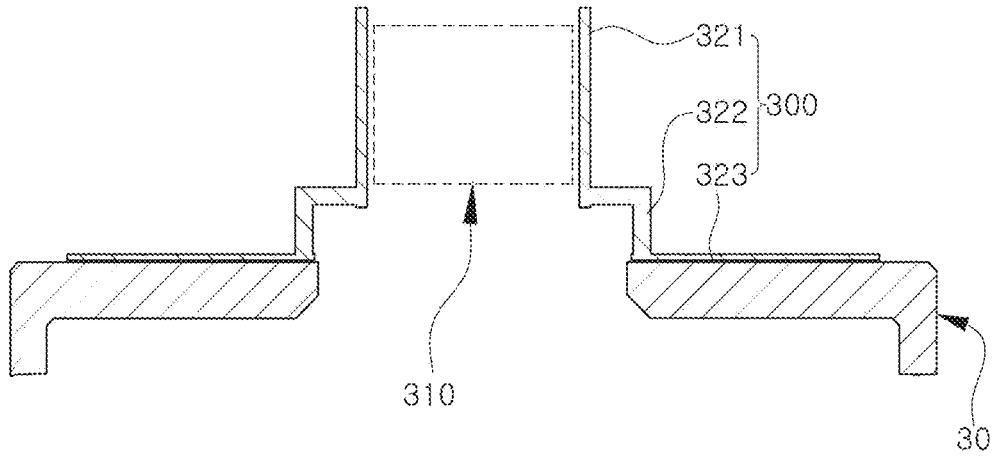
Figure 16A:
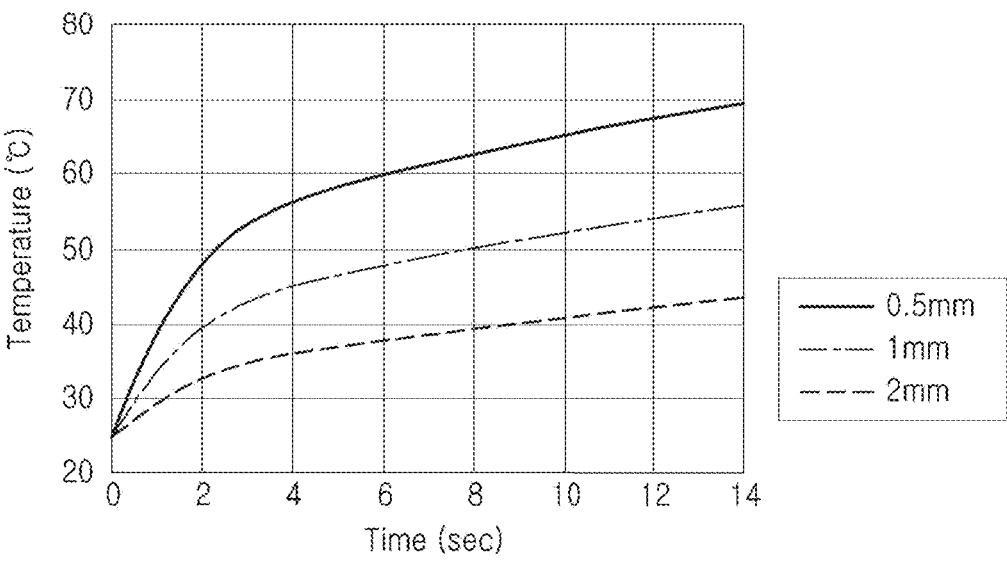
FIG. 16A and FIG. 16B are diagrams illustrating a change in temperature depending on a thickness of a heat transfer unit according to an exemplary embodiment of the present disclosure.
Figure 16B:
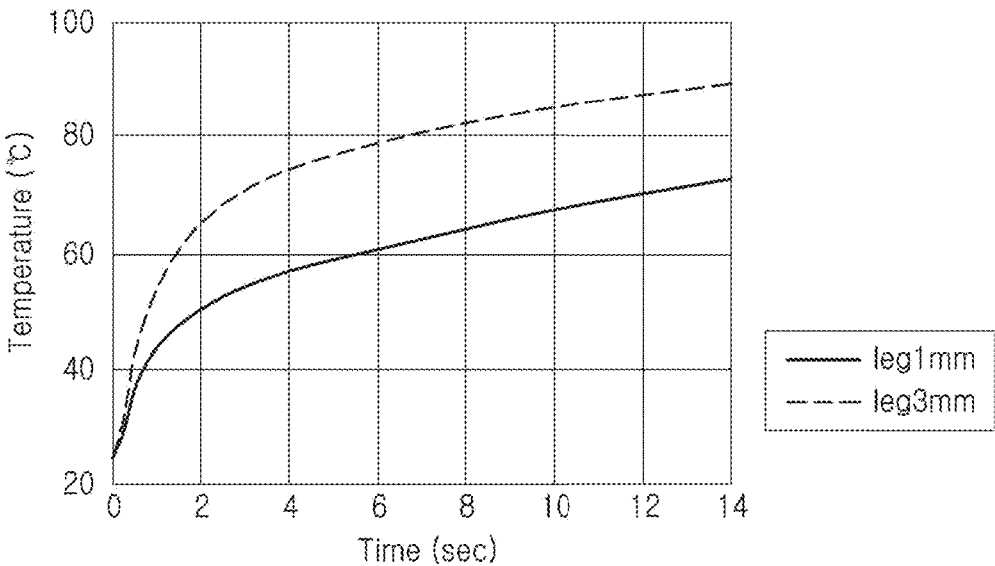

FIG. 15A and FIG. 15B are diagrams illustrating a heat transfer unit according to an exemplary embodiment of the present disclosure. FIG. 16A and FIG. 16B are diagrams illustrating a change in temperature depending on a thickness of a heat transfer unit according to an exemplary embodiment of the present disclosure.

As described above, when the rotation speed of the wheel increases, the centrifugal force generated by the weight 420 of the second power unit 400 may increase. Due to the centrifugal force, the weight 420 may move in a direction away from the center, and the central plate 110 connected to the weight 420 by the wire 430 may move down as the weight 420 moves, and the variable unit 100 may be closed. In the state in which the variable unit 100 is closed, air does not flow into the wheel 20, and the braking device 30 disposed in the wheel 20 may be overheated and the temperature may rise. When the temperature in the wheel 20 increases, the shape of the thermally responsive elastic member 310 may change due to the heat generated by the braking device 30, and the elastic force may increase according to the change in shape and the central plate 110 may move up so that the variable unit 100 may be opened. When the variable unit 100 is opened, air may flow into the open space of the variable unit 100 so that the overheated braking device 30 may be cooled. In other words, the thermally responsive elastic member 310 may open the variable unit 100 by heat generated by the overheated braking device 30, and may cool the braking device 30 by allowing air to flow into the open space. The thermally responsive elastic member 310 may need to receive maximum heat generated by the braking device 30 to prevent the braking device 30 from being excessively overheated. In other words, the thermally responsive elastic member 310 may need to operate sensitively to temperature changes in the braking device 30. Accordingly, the wheel cover 10 according to the exemplary embodiment of the present disclosure may further include a heat transfer unit 320 for transferring heat generated by the brake disc to the thermally responsive elastic member 310.

Referring to FIG. 15A and FIG. 15B, the heat transfer unit 320 may include a heat transfer plate 323 for receiving heat by being in contact with a cylindrical body portion 321 with both sides open and a portion of the braking device 30 (e.g., a brake disc), and a connection portion 322 for connecting the body portion 321 to the heat transfer unit 320. The heat transfer unit 320 may be formed of a metal (e.g., copper) including excellent thermal conductivity and corrosion resistance, but an exemplary embodiment thereof is not limited thereto.

The body portion 321 may include a thermally responsive elastic member 310 disposed therein, and may include a shape of cylinder to not interfere with the shaft 21 of the wheel 20. Because the body portion 321 includes a shape of cylinder, interference with existing devices such as the shaft 21 may be avoided, and heat may be transferred to the thermally responsive elastic member 310 disposed therein.

The heat transfer plate 323 may be disposed in the space between the braking device 30 and the wheel 20, may be in direct contact with a portion (e.g., a brake disc) of the braking device 30, and may transfer heat. The heat transfer plate 323 may be in a form of a plate including a wide cross-sectional area, and may absorb heat generated by securing a sufficient contact area with the braking device 30.

The heat transfer plate 323 may be connected to the body portion 321 through at least one connection portion 322, and the at least one connection portion 322 may transfer heat absorbed by the heat transfer plate 323 to the body portion 321. Heat generated by the braking device 30 may be transferred to the heat transfer plate 323 in contact with the braking device 30, and heat transferred to the heat transfer plate 323 may be transferred to the body portion 321 via the connection portion 322. The body portion 321 may transfer heat to the thermally responsive elastic member 310 disposed in the cylindrical structure.

FIG. 16A and FIG. 16B are diagrams illustrating the heat transfer capability according to the thickness of the body portion and the thickness of the connection portion of the heat transfer unit, illustrating simulation results by determining an ambient temperature of 25° C. and a brake heating temperature of 100° C. with respect to a heat transfer plate model formed of copper.

FIG. 16A illustrates the temperature change according to the thickness of the body portion as an example. Referring to FIG. 16A, it may be indicated that as the thickness of the body portion decreased, the heat generated by the brake was more properly transferred to the space in which the thermally responsive elastic member is disposed. As the thickness of the body portion decreased, heat capacity decreased so that the temperature of the body portion including a thin thickness may change more rapidly than that of the body portion including a thick thickness.

Also, FIG. 16B illustrates the temperature change according to the thickness of the connection portion as an example. Referring to FIG. 16B, as the thickness of the connection portion decreased, the heat may be more properly transferred. Because the connection portion transfers the heat absorbed by the heat transfer plate to the body portion mainly through heat conduction, as the cross-sectional area of the heat transfer unit increased, more heat may be transferred smoothly. It may be indicated that the temperature changed faster when the thickness of the connection portion was greater than when the thickness of the connection portion was thin.

Figure 17A:
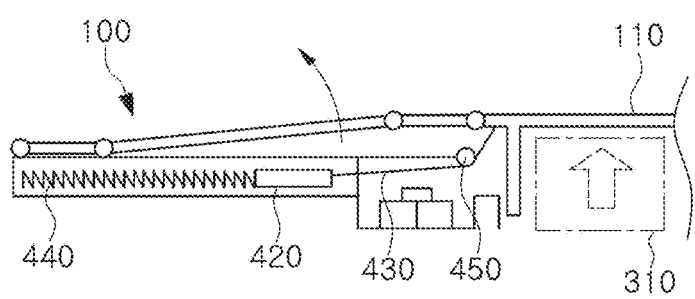
FIG. 17A, FIG. 17B and FIG. 17C are diagrams illustrating an operation process of a wheel cover according to an exemplary embodiment of the present disclosure.
Figure 17B:
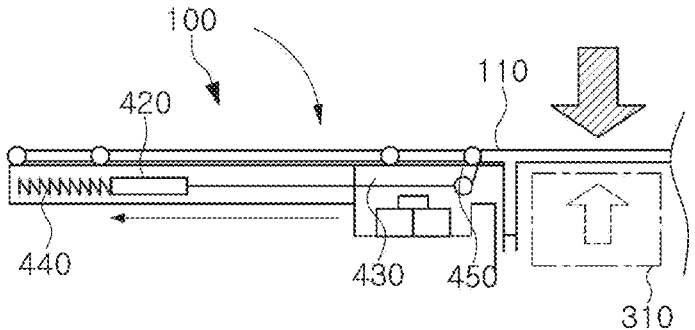
Figure 17C:
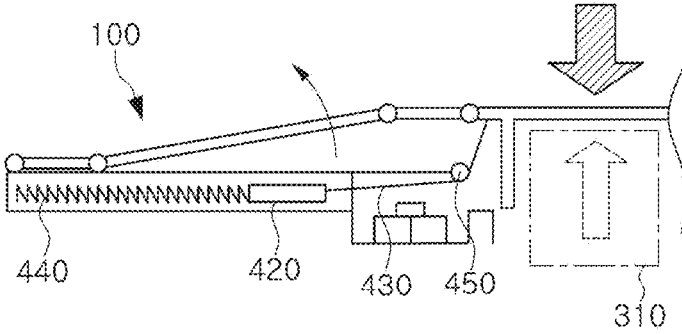

FIG. 17A, FIG. 17B and FIG. 17C are diagrams illustrating an operation process of a wheel cover 10 according to an exemplary embodiment of the present disclosure.

Referring to FIG. 17, the central plate 110 may move up by the first power unit 300 or may move down by the second power unit 400 according to forces acting on the first power unit 300 and the second power unit 400 so that the position thereof may change.

First, as illustrated in FIG. 17A, when the vehicle is not traveling, to enhance aesthetics of an exterior of a vehicle, the variable unit 100 may remain open due to the elastic force of the thermally responsive elastic member 310.

Thereafter, as illustrated in FIG. 17B, the force generated by the second power unit 400 may be resultant force of the elastic force of the elastic member 440 through the wire 430 fixed to the lower portion of the central plate 110 and the centrifugal force changing according to the rotation speed of the wheel 20, and may close the variable unit 100. Also, as illustrated in FIG. 17C, the force generated by the first power unit 300 may open the variable unit 100 by elastic force of the thermally responsive elastic member 310 disposed below the central plate 110, in particular, the elastic force of the thermally responsive elastic member 310 increased by receiving the heat generated from the braking device 30.

In other words, the forces generated by the first power unit 300 and the second power unit 400 may actin opposite directions, and the magnitude of the force generated by the first power unit 300 and the second power unit 400 may change based on the speed of the wheel 20 and the temperature of the braking device 30. The variable unit 100 may be opened or closed by changing the position of the central plate 110 according to the resultant force generated by the first power unit 300 and the second power unit 400.

Referring to FIG. 7 and Equation 1 together with FIG. 17, the force to close the variable unit 100 may increase in proportion to the mass of the weight 420 and may increase in proportion to the square of the rotation speed of the wheel 20, and may decrease slightly as the height of the central plate 110 increases. by appropriately adjusting the mass of the weight 420, the magnitude of the force generated by the second power unit 400 may be adjusted. Accordingly, by determining the mass of the weight 420 by comparing the elastic force of the variable unit 100, the opening amount and timing of the variable unit 100 may be adjusted. For example, when the mass of the weight 420 is excessive large, the thermally responsive elastic member 310 may be applied with centrifugal force greater than the elastic force increased with temperature so that the variable unit 100 may not open, and the braking device 30 may be cooled. Furthermore, when the mass of the weight 420 is determined to be excessive low, centrifugal force smaller than the elastic force of the thermally responsive elastic member 310 in the initial state may act so that the variable unit 100 may not be closed and air resistance may not be reduced.

Similarly, the temperature at which the elastic force and shape generated by the first power unit 300 may change may be changed. However, the temperature range in which the elastic force and shape generated by the first power unit 300 rapidly change may be determined by the method of manufacturing the thermally responsive elastic member 310 (e.g., the heat treatment temperature, the height of the height adjusting member 316, or the shape of the groove of the second jig 318). Also, the elastic modulus of the thermally responsive elastic member 310 in a form of a leaf spring increases in proportion to the number of thermally responsive elastic members 310 to be mounted, and accordingly, the elastic force may be adjusted by adjusting the number of thermally responsive elastic members 310.

Accordingly, in the wheel cover 10 according to the exemplary embodiment of the present disclosure, by adjusting the mass of the weight 420 of the second power unit 400 and the method of manufacturing the thermally responsive elastic members 310 or the number of the thermally responsive elastic members 310 of the first power unit 300, the wheel cover 10 may be closed at a target speed and may be opened in a temperature range in which overheating of the braking device 30 may not occur.

The wheel cover 10 in the exemplary embodiment of the present disclosure may include at least two embodiments according to an initial state, that is, a state in which the wheel 20 does not rotate and no heat is generated by the braking device 30.

Various exemplary embodiments of the present disclosure may be various exemplary embodiments in which the variable unit 100 may be open in an initial state, and another exemplary embodiment of the present disclosure is various exemplary embodiments in which the variable unit 100 may be in a closed state in an initial state.

In the case of the various exemplary embodiments of the present disclosure, the variable unit 100 may be in an opened state using the elastic force of the thermally responsive elastic member 310 and the elastic member 440 in the initial state and the height of the thermally responsive elastic member 310. In the various exemplary embodiments of the present disclosure, when the vehicle accelerates, the centrifugal force acting on the weight 420 may increase to close the variable unit 100, reducing air resistance and improving fuel efficiency. Furthermore, when the braking device 30 is overheated to a predetermined level or higher while driving with the variable unit 100 closed, the elastic force of the thermally responsive elastic member 310 may increase due to the overheated heat, opening the variable unit 100. Air may flow into the space between the open variable units 100 and may cool the braking device 30, preventing performance deterioration of the braking device 30. Furthermore, when the braking device 30 is sufficiently cooled, the elastic force of the thermally responsive elastic member 310 may be reduced, and when the centrifugal force generated by the weight 420 is less than the variable unit 100, the variable unit 100 may be closed. While the vehicle is driving, the above process may be repeatedly performed, and air resistance of the vehicle may be reduced, and performance degradation due to overheating of the braking device 30 may be prevented.

In the case of the various exemplary embodiments of the present disclosure, the variable unit 100 may be placed in a closed state using the elastic force of the thermally responsive elastic member 310 and the elastic member 440 in the initial state and the height of the thermally responsive elastic member 310. In the case of the various exemplary embodiments of the present disclosure, the vehicle may travel from an initial state to a closed state to reduce air resistance. Accordingly, in the case of the various exemplary embodiments of the present disclosure, differently from the various exemplary embodiments of the present disclosure, the weight 420 may not be included, and the variable unit 100 may be opened or closed only by the elastic force of the thermally responsive elastic member 310 and the elastic member 440. In the various exemplary embodiments of the present disclosure, the variable unit 100 may be opened or closed using the elastic force of the thermally responsive elastic member 310 and the elastic member 440. In the various exemplary embodiments of the present disclosure, when the braking device 30 overheats, the elastic force of the thermally responsive elastic member 310 may increase than the elastic force of the elastic member 440 to open the variable unit 100, and when the braking device 30 is cooled, the elastic force of the elastic member 440 may be reduced to be closed. Accordingly, until the braking device 30 overheats, the variable unit 100 may travel in a closed state by the elastic member 440, reducing air resistance of the vehicle. Furthermore, when the braking device 30 is over-heated, the variable unit 100 may be opened by the thermally responsive elastic member 310 to cool the braking device 30.

In the aforementioned embodiments, it has been described that, when the braking device 30 overheats, the kirigami structure of the variable unit 100 may protrude toward the external side of the wheel 20, but an exemplary embodiment thereof is not limited thereto, and the variable unit 100 may include a structure in which the kirigami structure is incor-porated into the internal side of the wheel.

For example, in the thermally responsive elastic member in a form of a leaf spring illustrated exemplarily in FIG. 12, a thermally responsive elastic member may be used so that the shape change may occur oppositely when cooling and when heating. That is, in the thermally responsive elastic member, the elastic force generated before the braking device may overheat may be greater than the elastic force generated when the braking device is overheated.

The thermally responsive elastic member before the brak-ing device is heated may be designed so that the elastic force of the thermally responsive elastic member pressing the variable unit to the external side may act greater than the elastic force of the second power unit pressing the variable unit to the internal side thereof. Here, the variable unit may be designed not to protrude from the external side of the wheel even when the elastic force of the thermally respon-sive elastic member is greater than that of the second power unit. Accordingly, the variable unit may maintain a closed state as long as the braking device is not overheated.

When the braking device is heated, the elastic force of the thermally responsive elastic member pressing the variable unit to the external side may decrease. In contrast, as the speed of the vehicle increases, the centrifugal force acting on the weight of the second power unit may increase so that the force for moving the variable unit to the internal side may increase. Accordingly, when the braking device is heated or the speed of the vehicle increases, the kirigami structure of the variable unit may be opened to the internal side thereof.

According to the aforementioned embodiments, because the wheels provided in the vehicle may be actively opened or closed, the air resistance generated by the wheel may be reduced by closing the wheel cover when the vehicle is traveling, and when the braking device is overheated during the driving of the vehicle, the braking device may be cooled by opening the wheel cover.

Also, to open or close the open space of the wheel, the open space of the wheel provided in the vehicle may be actively opened or closed without a power supply.

Also, using a member of which a shape changes based on temperature to open or close the wheel based on the tem-perature of the braking device, components such as a sensor to detect the state of the wheel (e.g., the temperature of the braking device inside the wheel) and wires to control the opening and closing device may not be necessary, and installation may be simplified.

Also, by including a structure for opening or closing the wheel cover using a kirigami structure, when there is no load, a flat structure may be formed so that a volume may be reduced and a wheel cover may be easily stored and trans-ported.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "for-wards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodi-ments of the present disclosure have been presented for purposes of illustration and description. They are not intended to be exhaustive or to limit the present disclosure to the precise forms disclosed, and obviously many modi-fications and variations are possible in light of the above teachings. The exemplary embodiments were chosen and described in order to explain certain principles of the inven-tion and their practical application, to enable others skilled in the art to make and utilize various exemplary embodi-ments of the present disclosure, as well as various alterna-tives and modifications thereof. It is intended that the scope of the present disclosure be defined by the Claims appended hereto and their equivalents.

What is claimed is:

1. A wheel cover with moveable vent structure, the wheel cover comprising:
   a fixing unit fixed to a wheel of a vehicle;
   a variable unit coupled to and supported by the fixing unit to open or close an external side surface of the wheel;
   a first power unit generating a first force acting on the variable unit, wherein the first force changes depending on temperature; and
   a second power unit generating a second force acting on the variable unit, wherein the second force changes depending on a wheel speed,
   wherein the variable unit is opened or closed depending on the first force generated by the first power unit and the second force generated by the second power unit.

2. The wheel cover with the moveable vent structure of claim 1, wherein the first power unit includes a thermally responsive elastic member of which elastic force changes depending on the temperature.

3. The wheel cover with the moveable vent structure of claim 2, wherein, in the thermally responsive elastic mem-ber, the elastic force generated based on a linear change in the temperature, changes nonlinearly.

4. The wheel cover with the moveable vent structure of claim 1, wherein the first power unit further includes:
   a heat transfer plate in contact with a braking device mounted on the wheel; and
   a heat transfer unit connected to the heat transfer plate and including a body portion enclosing the thermally responsive elastic member.

5. The wheel cover with the moveable vent structure of claim 1, wherein the variable unit includes:
   a fixing unit coupling plate coupled to the fixing unit;
   a central plate coupled to the first power unit and the second power unit and moved according to the first force generated by the first power unit and the second force generated by the second power unit; and
   a variable plate connecting the fixing unit coupling plate to the central plate, wherein the variable plate opens or closes the external side surface of the wheel according to the movement of the central plate.

6. The wheel cover with the moveable vent structure of claim 1,
   wherein the variable unit includes a central plate coupled to the first power unit and the second power unit and moved according to the first force generated by the first power unit and the second force generated by the second power unit,
   wherein the second power unit includes a weight connected to the central plate by a wire, and
   wherein force acting on the variable unit changes by the weight rotating together with the wheel.

7. The wheel cover with the moveable vent structure of claim 6, wherein the second power unit further includes a guide slide, and the weight moves along the guide slide.

8. The wheel cover with the moveable vent structure of claim 7, wherein the second power unit includes an elastic member coupled to the weight and a portion of the guide slide.

9. The wheel cover with the moveable vent structure of claim 1, wherein the variable unit is open while the wheel is stopped.

10. The wheel cover with the moveable vent structure of claim 1, wherein the variable unit is closed while the wheel is stopped.

11. A wheel cover with the moveable vent structure, the wheel cover comprising:
   a fixing unit fixed to a wheel of a vehicle together with a braking device;
   a variable unit coupled to the fixing unit to open or close an external side surface of the wheel;
   a first power unit including a thermally responsive elastic member to generate a first force to the variable unit; and
   a second power unit including an elastic member to generate a second force to the variable unit,
   wherein the thermally responsive elastic member non-linearly generates a first elastic force in a predetermined temperature range, and the elastic member generates a second elastic force linearly with respect to a change in length.

12. The wheel cover with the moveable vent structure of claim 11, wherein the variable unit includes:
   a fixing unit coupling plate coupled to the fixing unit;
   a central plate coupled to the first power unit and the second power unit and moved in a direction of a rotation axis of the wheel; and
   a variable plate connecting the fixing unit coupling plate to the central plate,
   wherein the variable plate opens or closes the external side surface of the wheel according to the movement of the central plate.

13. The wheel cover with the moveable vent structure of claim 12, wherein the variable unit includes a connection plate disposed between the central plate and the variable plate and rotatably coupled to each of the central plate and the variable plate.

14. The wheel cover with the moveable vent structure of claim 11, wherein the thermally responsive elastic member is a leaf spring including a shape memory alloy.

15. The wheel cover with the moveable vent structure of claim 11, wherein the thermally responsive elastic member is a coil spring including a shape memory alloy.

16. The wheel cover with the moveable vent structure of claim 11, wherein the first power unit further includes a heat transfer unit including a body portion enclosing the thermally responsive elastic member.

17. The wheel cover with the moveable vent structure of claim 16, further including:
   a heat transfer plate in contact with the braking device; and
   a connection portion connecting the heat transfer plate to the body portion.

18. The wheel cover with the moveable vent structure of claim 11, wherein the thermally responsive elastic member generates the first elastic force greater than the second elastic force of the elastic member in the predetermined temperature range.

19. The wheel cover with the moveable vent structure of claim 11, wherein the variable unit is closed while the wheel is stopped.

* * * * *